United States Patent
Vassilieva et al.

(10) Patent No.: US 9,312,914 B2
(45) Date of Patent: Apr. 12, 2016

(54) CROSSTALK REDUCTION IN OPTICAL NETWORKS USING VARIABLE SUBCARRIER POWER LEVELS

(71) Applicant: Fujitsu Limited, Kawasaki-shi, Kanagawa (JP)

(72) Inventors: Olga Vassilieva, Plano, TX (US); Motoyoshi Sekiya, Richardson, TX (US)

(73) Assignee: Fujitsu Limited, Kawasaki-shi (JP)

( * ) Notice: Subject to any disclaimer, the term of this patent is extended or adjusted under 35 U.S.C. 154(b) by 127 days.

(21) Appl. No.: 14/033,090

(22) Filed: Sep. 20, 2013

(65) Prior Publication Data
US 2014/0314416 A1    Oct. 23, 2014

Related U.S. Application Data

(60) Provisional application No. 61/814,551, filed on Apr. 22, 2013.

(51) Int. Cl.
| | | |
|---|---|---|
| H04B 10/00 | (2013.01) | |
| H04B 3/32 | (2006.01) | |
| H04B 10/079 | (2013.01) | |
| H04B 10/50 | (2013.01) | |
| H04B 10/564 | (2013.01) | |

(52) U.S. Cl.
CPC .............. *H04B 3/32* (2013.01); *H04B 10/0799* (2013.01); *H04B 10/506* (2013.01); *H04B 10/564* (2013.01)

(58) Field of Classification Search
CPC ........ H04B 3/32; H04B 10/27; H04J 14/0227
See application file for complete search history.

(56) References Cited

U.S. PATENT DOCUMENTS

| | | | | |
|---|---|---|---|---|
| 5,546,210 | A * | 8/1996 | Chraplyvy et al. ............. | 398/79 |
| 5,579,145 | A * | 11/1996 | Bogdan et al. .................... | 398/9 |
| 5,784,170 | A * | 7/1998 | Park ..................... | H04B 10/505 |
| | | | | 385/122 |
| 6,118,561 | A * | 9/2000 | Maki .................... | H04B 10/506 |
| | | | | 398/1 |
| 8,009,985 | B1 * | 8/2011 | Roberts ...................... | H04J 3/14 |
| | | | | 398/47 |
| 2004/0131353 | A1 * | 7/2004 | Cannon et al. ..................... | 398/1 |
| 2006/0034610 | A1 * | 2/2006 | Akiyama et al. ................ | 398/83 |
| 2008/0316937 | A1 * | 12/2008 | Shi ........................... | H04B 3/32 |
| | | | | 370/252 |
| 2010/0007355 | A1 * | 1/2010 | Olgaard ............... | H04B 17/327 |
| | | | | 324/601 |
| 2012/0269506 | A1 * | 10/2012 | Vassilieva ........... | H04J 14/0221 |
| | | | | 398/26 |
| 2013/0322877 | A1 * | 12/2013 | Geyer .............. | H04B 10/07957 |
| | | | | 398/38 |
| 2014/0314416 | A1 * | 10/2014 | Vassilieva ................ | H04B 3/32 |
| | | | | 398/76 |

OTHER PUBLICATIONS

Igarashi et al., "Bit-error Rate Performance of Nyquist Wavelength-Division Multiplexed Quadrature Phase-Shift Keying Optical Signals", *Optical Society of America*, 3 pages, 2011.
Bosco et al., "Performance Limits of Nyquist-WDM and CO-OFDM in High-Speed PM-QPSK Systems", *IEEE Photonics Technology Letters*, vol. 22, No. 15, p. 1129-1131, Aug. 1, 2010.

* cited by examiner

*Primary Examiner* — Danny Leung
(74) *Attorney, Agent, or Firm* — Baker Botts L.L.P.

(57) ABSTRACT

A method and system for reducing crosstalk among subcarriers of a super-channel may involve adjusting power levels of the subcarriers. In one example, power levels of edge and/or intermediate subcarriers may be reduced relative to center subcarriers in the super-channel band. The adjustment in power level may lead to overall reduction in optical signal-to-noise ratio degradation.

21 Claims, 4 Drawing Sheets

CROSSTALK REDUCTION IN OPTICAL NETWORKS USING VARIABLE SUBCARRIER POWER LEVELS

CROSS-REFERENCE TO RELATED APPLICATION

This application claims priority from U.S. Provisional Application No. 61/814,551 filed Apr. 22, 2013, which is hereby incorporated by reference.

BACKGROUND

1. Field of the Disclosure

The present disclosure relates generally to optical communication networks and, more particularly, to a system and method for reducing crosstalk in optical networks using variable subcarrier power levels.

2. Description of the Related Art

Telecommunications systems, cable television systems and data communication networks use optical networks to rapidly convey large amounts of information between remote points. In an optical network, information is conveyed in the form of optical signals through optical fibers. Optical networks may also include various network elements such as amplifiers, dispersion compensators, multiplexer/demultiplexer filters, wavelength selective switches, couplers, etc. configured to perform various operations within the network.

Optical super-channels are an emerging solution for transmission of signals at 400 Gb/s and 1 Tb/s data rate per channel. A typical super-channel may include a set of subcarriers that are frequency multiplexed to form a single wavelength channel. The super-channel may then be transmitted through an optical network as a single channel across network endpoints. The subcarriers within the super-channel may be tightly packed to achieve high spectral efficiency. In order to minimize linear crosstalk between neighboring subcarriers the Nyquist filtering may be applied at the transmitter end of the optical network.

SUMMARY

In one aspect, a method of reducing crosstalk among subcarriers of a super-channel includes receiving a plurality of data streams for transmission over an optical transport network as the super-channel, the super-channel comprising a plurality of subcarrier bands, and assigning optical frequencies to the subcarrier bands. The method may include adjusting power levels, respectively, for at least some of the subcarrier bands. As a result of adjusting the power levels, at least two subcarrier bands may have different power levels. The method may include optically modulating the data streams into the subcarrier bands using the assigned optical frequencies and the adjusted power levels, and combining the subcarrier bands into the super-channel.

Other disclosed aspects include an optical transport network and an optical control plane system for reducing crosstalk among subcarriers of a super-channel using variable subcarrier power levels, as described herein.

BRIEF DESCRIPTION OF THE DRAWINGS

For a more complete understanding of the present invention and its features and advantages, reference is now made to the following description, taken in conjunction with the accompanying drawings, in which.

DESCRIPTION OF THE EMBODIMENT(S)

Figure 1:
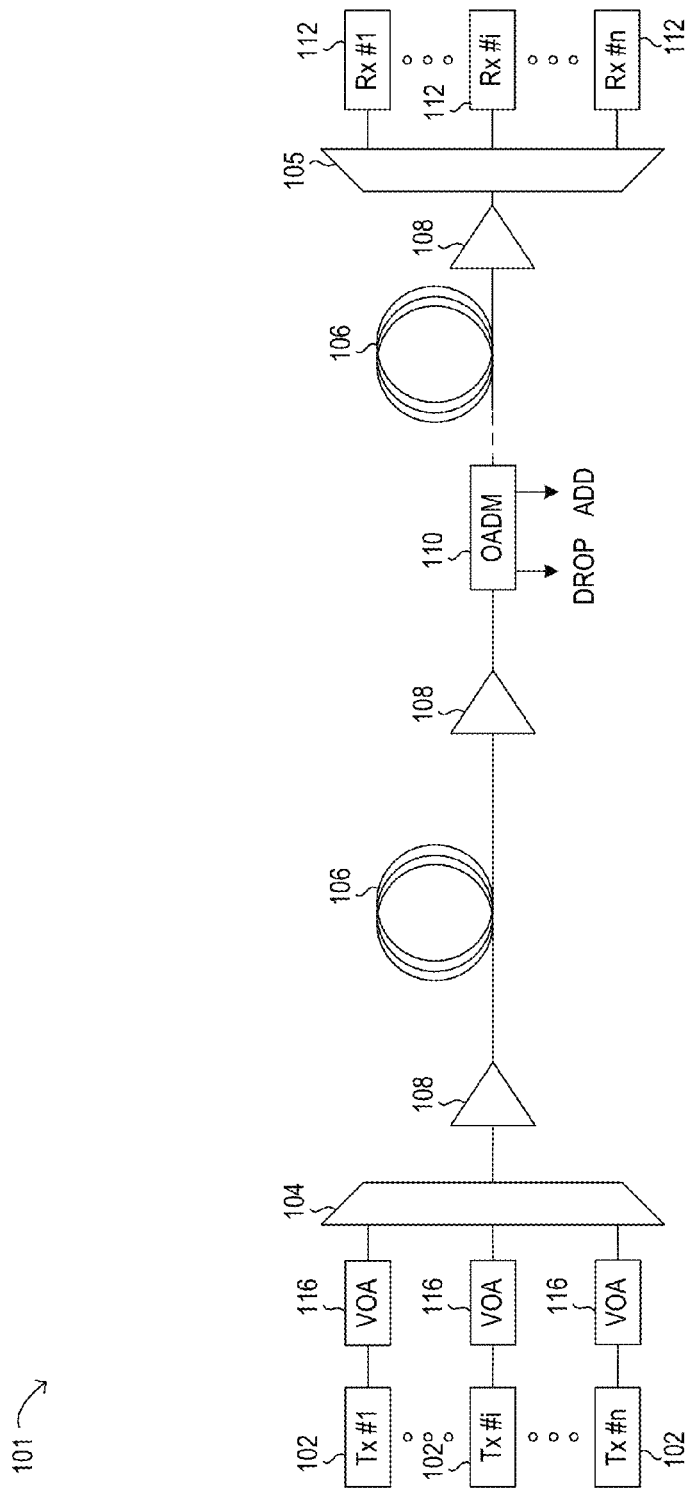
FIG. 1 is a block diagram of selected elements of an embodiment of an optical transport network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

Turning now to the drawings, FIG. 1 illustrates an example embodiment of optical transport network (OTN) 101. Optical transport network 101 may include one or more optical fibers 106 configured to transport one or more optical signals communicated by components of optical transport network 101. The network elements of optical transport network 101, coupled together by fibers 106, may comprise one or more transmitters 102, one or more multiplexers (MUX) 104, one or more amplifiers 108, one or more optical add/drop multiplexers (OADM) 110, and one or more receivers 112.

Optical transport network 101 may comprise a point-to-point optical network with terminal nodes, a ring optical network, a mesh optical network, or any other suitable optical network or combination of optical networks. Optical fibers 106 comprise thin strands of glass capable of communicating the signals over long distances with very low loss. Optical fibers 106 may comprise any suitable type of fiber, such as a Single-Mode Fiber (SMF), Enhanced Large Effective Area Fiber (ELEAF), or a TrueWave® Reduced Slope (TW-RS) fiber.

Optical transport network 101 may include devices configured to transmit optical signals over fibers 106. Information may be transmitted and received through optical transport network 101 by modulation of one or more wavelengths of light to encode the information on the wavelength. In optical networking, a wavelength of light may also be referred to as a channel. Each channel may be configured to carry a certain amount of information through optical transport network 101.

To increase the information carrying capabilities of optical transport network 101, multiple signals transmitted at multiple channels may be combined into a single optical signal, which is referred to herein as a "multi-carrier" optical signal, while the individual channels included in a multi-carrier optical signal are referred to herein as "subcarriers". The process of communicating information at multiple channels of a single optical signal is referred to in optics as wavelength division multiplexing (WDM). Dense wavelength division multiplexing (DWDM) refers to the multiplexing of a larger (denser) number of wavelengths, usually greater than forty, into a fiber. WDM, DWDM, or other multi-wavelength transmission techniques are employed in optical networks to increase the aggregate bandwidth per optical fiber. Without WDM or DWDM, the bandwidth in optical transport networks may be limited to the bit-rate of one wavelength. With more bandwidth, optical transport networks are capable of transmitting greater amounts of information. Optical transport network 101 may be configured to transmit disparate channels using WDM, DWDM, or some other suitable multi-carrier multiplexing technique, and to amplify the multi-carrier signal.

Recently, advancements in DWDM enabled combining several optical carriers to create a composite optical signal of a desired capacity. One such example of a multi-carrier optical signal is a super-channel, which is an example of high spectral efficiency (SE) that may attain transmission rates of 100 Gb/s or higher. Thus, in a super-channel, subcarriers are tightly packed and consume less optical spectrum than conventional DWDM. Another distinctive feature of super-channels is that the subcarriers in a super-channel travel from the same origin to the same destination, and are not added or removed using an OADM while in transmission. Techniques for achieving high spectral efficiency (SE) in optical networks may include the use super-channels modulated using dual-polarization quadrature phase-shift keying (DP-QPSK) for long-haul transmission at data rates of 100 Gb/s or greater. In particular embodiments, Nyquist wavelength-division multiplexing (N-WDM) may be used in a super-channel. In N-WDM, optical pulses having a nearly rectangular spectrum are packed together in the frequency domain with a bandwidth approaching the Baud rate (see also FIG. 2).

Optical transport network 101 may include one or more optical transmitters (Tx) 102 configured to transmit optical signals through optical network 101 in specific wavelengths or channels. Transmitters 102 may comprise any system, apparatus or device configured to convert an electrical signal into an optical signal and transmit the optical signal. For example, transmitters 102 may each comprise a laser and a modulator configured to receive electrical signals and modulate the information contained in the electrical signals onto a beam of light produced by the laser at a particular wavelength and transmit the beam carrying the signal throughout the network. As shown in FIG. 1, transmitters 102 may respectively send their optical output signal to variable optical attenuators 116, which may enable power adjustment for each individual channel or individual subcarrier in the case of a super-channel.

Multiplexer 104 may be coupled to transmitters 102 and may be any system, apparatus or device configured to combine the signals transmitted by transmitters 102, in individual wavelengths, into a single WDM, DWDM, and/or super-channel signal.

Amplifiers 108 may amplify the multi-channeled signals within optical transport network 101. Amplifiers 108 may be positioned before and/or after certain lengths of fiber 106. Amplifiers 108 may comprise any system, apparatus, or device configured to amplify signals. For example, amplifiers 108 may comprise an optical repeater that amplifies the optical signal. This amplification may be performed with opto-electrical or electro-optical conversion. In some embodiments, amplifiers 108 may comprise an optical fiber doped with a rare-earth element. When a signal passes through the fiber, external energy may be applied to excite the atoms of the doped portion of the optical fiber, which increases the intensity of the optical signal. As an example, amplifiers 108 may comprise an erbium-doped fiber amplifier (EDFA). However, any other suitable amplifier, such as a semiconductor optical amplifier (SOA), may be used.

OADMs 110 may also be coupled to optical transport network 101 via fibers 106. OADMs 110 comprise an add/drop module, which may include any system, apparatus or device configured to add and/or drop optical signals from fibers 106. After passing through an OADM 110, a signal may travel along fibers 106 directly to a destination, or the signal may be passed through one or more additional OADMs 110 before reaching a destination.

Many existing optical networks are operated at 10 gigabit-per-second (Gbps) or 40 Gbps signal rates with 50 gigahertz (GHz) of channel spacing in accordance with International Telecommunications Union (ITU) standard wavelength grids, also known as fixed-grid spacing, which is compatible with conventional implementations of OADMs 110 and with conventional implementations of demultiplexers 105. However, as data rates increase to 100 Gbps and beyond, the wider spectrum requirements of such higher data rate signals often require increasing channel spacing. In traditional fixed grid networking systems supporting signals of different rates, the entire network system typically must be operated with the coarsest channel spacing (100 GHz, 200 GHz, etc.) that can accommodate the highest rate signals. This may lead to an over-provisioned channel spectrum for lower-rate signals and lower overall spectrum utilization.

Thus, in certain embodiments, optical transport network 101 may employ components compatible with flexible grid optical networking that enables specifying a particular frequency slot per channel. For example, each wavelength channel of a WDM transmission may be allocated using at least one frequency slot. Accordingly, one frequency slot may be assigned to a wavelength channel whose symbol rate is low, while a plurality of frequency slots may be assigned to a wavelength channel whose symbol rate is high. Thus, in certain embodiments of optical transport network 101, OADM 110 may represent a reconfigurable OADM (ROADM) that is capable of adding or dropping individual or multiple wavelengths of a WDM, DWDM, and/or super-channel signal carrying data channels to be added or dropped in the optical domain. In certain embodiments, OADM 110 may include or be coupled to a wavelength selective switch (WSS).

Optical transport network 101 may also include one or more demultiplexers 105 at one or more destinations of network 101. Demultiplexer 105 may comprise any system apparatus or device that may act as a demultiplexer by splitting a single WDM signal into its individual channels. For example, when optical transport network 101 transmits a forty channel DWDM signal, demultiplexer 105 may divide the single, forty channel DWDM signal into forty separate signals according to the forty different channels. It will be understood that different numbers of channels and/or subcarriers may be transmitted and demultiplexed in optical transport network 101, in various embodiments.

Optical transport network 101 may also include receivers 112 coupled to demultiplexer 105. Each receiver 112 may be configured to receive signals transmitted in a particular wavelength or channel, and process the signals for the information that they contain. Accordingly, network 101 may include at least one receiver 112 for every channel of the network.

Optical networks, such as optical transport network 101, may further employ modulation schemes to convey information in the optical signals over the optical fibers. Such modulation schemes may include phase-shift keying ("PSK"), frequency-shift keying ("FSK"), amplitude-shift keying ("ASK"), and quadrature amplitude modulation ("QAM"). In PSK, the information carried by the optical signal may be conveyed by modulating the phase of a reference signal, also known as a carrier wave, or simple, a carrier. The information may be conveyed by modulating the phase of the signal itself using differential phase-shift keying ("DPSK"). In QAM, the information carried by the optical signal may be conveyed by modulating both the amplitude and phase of the carrier wave. PSK may be considered a subset of QAM, wherein the amplitude of the carrier waves is maintained as a constant.

PSK and QAM signals may be represented using a complex plane with real and imaginary axes on a constellation diagram. The points on the constellation diagram representing symbols carrying information may be positioned with uniform angular spacing around the origin of the diagram. The number of symbols to be modulated using PSK and QAM may be increased and thus increase the information that can be carried. The number of signals may be given in multiples of two. As additional symbols are added, they may be arranged in uniform fashion around the origin. PSK signals may include such an arrangement in a circle on the constellation diagram, meaning that PSK signals have constant power for all symbols. QAM signals may have the same angular arrangement as that of PSK signals, but include different amplitude arrangements. QAM signals may have their symbols arranged around multiple circles, meaning that the QAM signals include different power for different symbols. This arrangement may decrease the risk of noise as the symbols are separated by as much distance as possible. A number of symbols "m" may thus be used and denoted "m-PSK" or "m-QAM."

Examples of PSK and QAM with a different number of symbols can include binary PSK ("BPSK" or "2-PSK") using two phases at 0° and 180° (or in radians, 0 and $\pi$) on the constellation diagram; or quadrature PSK ("QPSK", "4-PSK", or "4-QAM") using four phases at 0°, 90°, 180°, and 270° (or in radians, 0, $\pi/2$, $\pi$, and $3\pi/2$). Phases in such signals may be offset. Each of 2-PSK and 4-PSK signals may be arranged on the constellation diagram. Certain m-PSK signals may also be polarized using techniques such as dual-polarization QPSK ("DP-QPSK"), wherein separate m-PSK signals are multiplexed by orthogonally polarizing the signals. Also, m-QAM signals may be polarized using techniques such as dual-polarization 16-QAM ("DP-16-QAM"), wherein separate m-QAM signals are multiplexed by orthogonally polarizing the signals.

Modifications, additions or omissions may be made to optical transport network 101 without departing from the scope of the disclosure. For example, optical transport network 101 may include more or fewer elements than those depicted. Additionally optical transport network 101 may include additional elements not expressly shown, such as a dispersion compensation module. Also, as mentioned above, although depicted as a point to point network, optical transport network 101 may comprise any suitable network for transmitting optical signals such as a ring or mesh network.

In operation, optical transport network 101 may be used to transmit a super-channel, in which a plurality of subcarrier signals are densely packed in a fixed bandwidth band and may be transmitted at very high data rates, such as 400 Gb/s, 1 Tb/s, or higher. Furthermore, a super-channel may be well suited for transmission over very long distances, such as hundreds of kilometers, for example. A typical super-channel may comprise a set of subcarriers that are frequency multiplexed to form a single channel and which are transmitted through the entire network as one entity. The subcarriers within the super-channel may be tightly packed to achieve high spectral efficiency. In order to minimize linear crosstalk between neighboring subcarriers in the super-channel, Nyquist filtering may be applied at the transmitter side to shape the subcarrier frequency bands (see also FIG. 2).

Recently, it has been discovered that subcarriers in a super-channel may exhibit different degrees of BER, and accordingly OSNR, which may be observed at receivers 112. For example, subcarriers in a central band of the super-channel may suffer from larger BER due to non-linear interaction compared to subcarriers in an edge band of the super-channel. Such a variance in BER among the subcarriers of a super-channel may be undesirable for an operator of optical transport network 101. The operator (or network service provider) of optical transport network 101 may desire uniform performance for every transmitted channel for operational and/or economic reasons. As will be described in further detail herein, optical transport network 101 may implement variable subcarrier power levels to reduce or eliminate an OSNR variance among subcarriers of a super-channel. Specifically, a transmitted power level of certain subcarriers (i.e., the subcarrier frequency bands) within the fixed bandwidth super-channel may be adjusted to optimize a combination of linear and non-linear interactions that are responsible for OSNR penalties during transmission, resulting in an overall improvement in both OSNR and OSNR uniformity among the subcarriers.

As noted above, optical super-channels may represent a promising solution for transmission of signals at 400 Gb/s and 1 Tb/s data rate per channel. Various transmission experiments with super-channels have revealed that each subcarrier within a super-channel may experience different amounts of linear and non-linear interactions with neighboring subcarriers, resulting in different received OSNR penalties. For example, an intermediate band of the super-channel may suffer from larger non-linear interaction compared to subcarriers in an edge band of the super-channel. In order to compensate for such effects, a variable subcarrier power level adjustment method, as described herein, may lower transmitted power levels for certain intermediate subcarriers bands. In other words, certain intermediate subcarrier bands may be attenuated to transmit at a lower power levels with the super-channel. Because OSNR is proportional to fiber input power, reduction of power may slightly reduce OSNR for an individual subcarrier. However, the power level reduction of an intermediate subcarrier in a super-channel may also reduce intra-subcarrier non-linear interactions that result in OSNR degradation in neighboring subcarriers. In this manner, slightly lower OSNR may be intentionally induced on certain subcarriers in the super-channel band, while non-linear crosstalk effects may be significantly reduced. Such a variable subcarrier power level adjustment may result in overall reduced OSNR degradation, when viewed across all subcarriers in the super-channel, and may further equalize OSNR penalties for all subcarriers.

Figure 2:
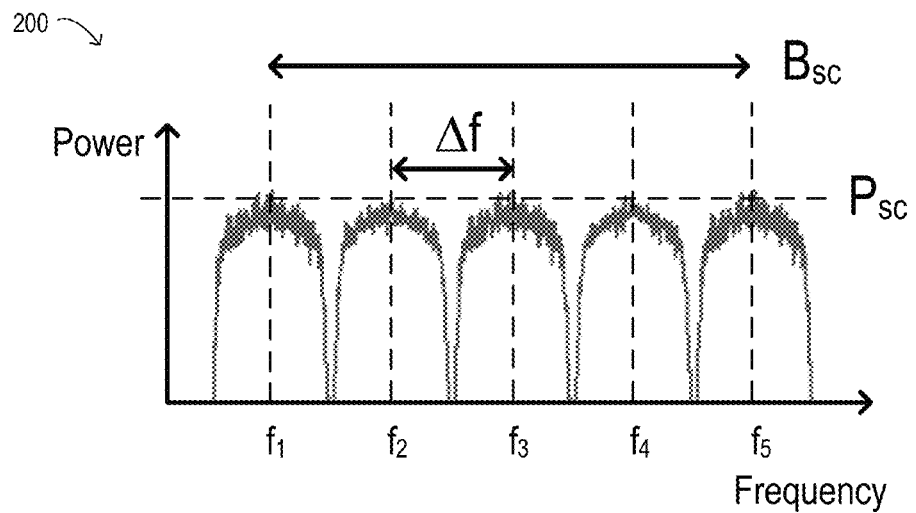
FIG. 2 shows selected elements of an embodiment of a super-channel frequency spectrum.

Turning now to FIG. 2, selected elements of an embodiment of a super-channel is shown as simulated frequency spectrum 200, which depicts five (5) subcarriers. While the data used for simulated frequency spectrum 200 are not actual measured values, the illustrated frequency spectrum may be characteristic of an actual super-channel. In simulated frequency spectrum 200, the subcarriers may each be modulated with 200 GB/s DP-16-QAM signals. Furthermore, each subcarrier band has been electrically Nyquist pulse shaped in the transmitter using a root raised cosine method using a roll-off factor of 0.15. As shown in FIG. 2, $B_{SC}$ may represent the fixed super-channel transmission band, while $\Delta f$ may represent the subcarrier spacing. In certain embodiments, the subcarrier spacing $\Delta f$ may be 35 GHz and may be uniform between each center frequency $f_1$, $f_2$, $f_3$, $f_4$, and $f_5$, respectively corresponding to the subcarrier bands. The spacing Δf may be selected to be wide enough to prevent any significant linear crosstalk between adjacent subcarriers. The optical signal of each subcarrier may be multiplexed using an optical coupler to form the single super-channel in the fixed transmission band $B_{SC}$ having an aggregate data rate of 1 Tb/s. Also shown in FIG. 2 is constant power level, $P_{SC}$, that is substantially similar or equal for each of the 5 subcarrier bands.

In typical DWDM networks, it is known that system performance may depend on an allocation of each wavelength channel on the wavelength grid, such that a longer wavelength channel may suffer from smaller non-linear impairments compared to a shorter wavelength channel. In case of super-channel-based WDM systems, in addition to the wavelength dependency of the subcarrier error rate across the transmission band, $B_{SC}$, a dependency of individual subcarrier error rate (or OSNR at the receiver) on spectral allocation of the subcarrier within the super-channel has now been observed in the form of non-linear impairments (i.e., cross-talk). Linear cross-talk may be observed between two adjacent subcarrier bands (i.e., inter-subcarrier) and may depend on a degree or extent of overlap in the frequency domain of the adjacent subcarrier bands. The use of Nyquist pulse shaping, as shown in FIG. 2, may represent an effective means for maintaining a minimum level of linear cross-talk between adjacent subcarriers, at least in part due to the nearly vertical edges of the Nyquist-shaped subcarrier bands (i.e. pulses) that do not substantially overlap each other in the frequency domain. Non-linear cross-talk may also be observed and may arise from non-linear interactions during fiber transmission. The non-linear interactions may include phenomena such as cross-phase modulation (XPM), self-phase modulation (SPM), and four-wave mixing, among others. Cross-phase modulation may occur when phase and/or amplitude information from one channel is modulated to an adjacent channel in the super-channel. Self-phase modulation may arise when a variation in the refractive index (or a dependency of the refractive index on intensity) results in a phase shift within each subcarrier. In four-wave mixing, three wavelengths may interact to create a fourth wavelength that may coincide with a wavelength of a subcarrier, and may lead to undesirable variations in peak power and/or other types of signal distortion on the affected subcarrier. Furthermore, non-linear cross-talk may comprise inter-subcarrier components. Since non-linear interactions occur during fiber transmission and may not depend on a degree of overlap of the subcarrier frequency bands, Nyquist pulse shaping may be ineffective in resolving problems with non-linear cross-talk in a super-channel. As will be described in further detail herein, at least some of the subcarrier bands depicted in simulated frequency spectrum 200 may be adjusted with lower power levels, compared to $P_{SC}$, to reduce the variation in OSNR between the individual subcarrier bands.

Figure 3:
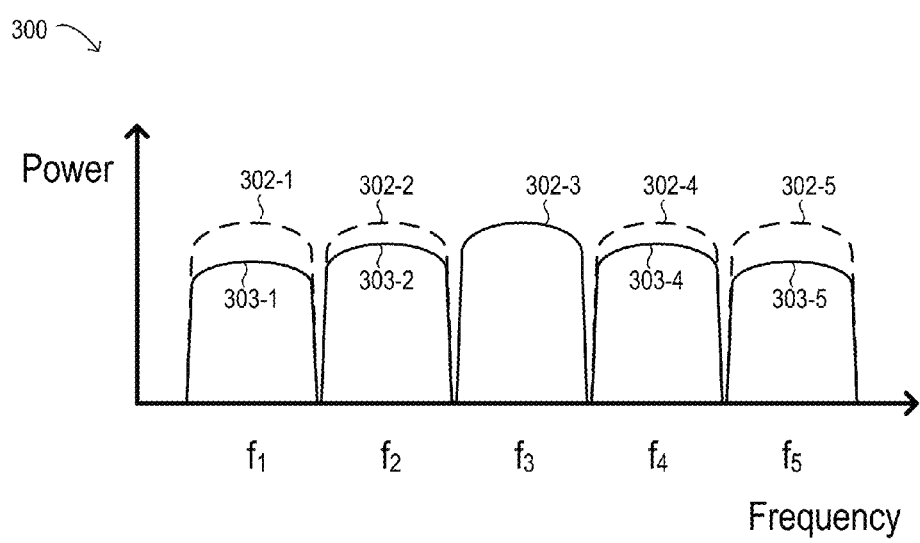
FIG. 3 shows selected elements of an embodiment of a super-channel frequency spectrum.

Turning now to FIG. 3, selected elements of an embodiment of a super-channel is shown as simulated frequency spectrum 300, which depicts five (5) subcarriers 302. As shown in FIG. 3, subcarriers 302 are depicted in simplified form for descriptive clarity, yet may still correspond to the subcarrier bands depicted in simulated frequency spectrum 200 (see FIG. 2). In simulated frequency spectrum 300, subcarrier bands 302-1 and 302-5 are designated as "edge bands" or "edge subcarriers" or "edge subcarrier bands" in reference to their edge positions within the super-channel subcarrier bands, and may define an overall fixed bandwidth of the super-channel. In the arrangement shown in FIG. 3 with 5 subcarrier bands (i.e., an odd number of subcarrier bands), subcarrier band 302-3 is designated a center subcarrier band, such that the frequency $f_3$ of subcarrier band 302-3 is given by the average value of frequencies $f_1$ and $f_5$. The remaining subcarrier bands 302-2 and 302-4 are termed "intermediate bands" or "intermediate subcarriers" or "intermediate subcarrier bands". According to the methods described herein, a power level adjustment may be applied to edge subcarrier bands 302-1, 302-5 and intermediate subcarrier bands 302-2, 302-4. Center subcarrier band 302-3, when present in a super-carrier having an odd number of subcarriers, may be omitted from the power level adjustment.

Specifically, a first power level adjustment may be performed to edge bands 302-1, 302-5 to result in adjusted edge bands 303-1, 303-5, which may be symmetrically adjusted with respect to center band 302-3 (or a center frequency of the super-channel). Also, a second power level adjustment may be performed to intermediate bands 302-2, 302-4 to result in adjusted intermediate bands 303-2, 303-4, which may also be symmetrically adjusted within the super-channel. As a result of the power level adjustments, non-linear inter-subcarrier impairments to subcarrier bands $f_2$, $f_3$, and $f_4$ may be significantly reduced, while certain OSNR degradation is imposed on subcarrier bands $f_1$, $f_2$, $f_4$ and $f_5$, when all five subcarrier bands are transmitted as a super-channel. The amount of increase of OSNR degradation may be very small compared to the decrease of non-linear cross-talk achieved in this manner. In addition, as a result of the power level adjustments, OSNR penalties induced by other non-linear intra-subcarrier impairments, such as self-phase modulation (SPM), to subcarriers $f_1$, $f_2$, $f_4$ and $f_5$ may be also reduced. Thus, the overall variation of OSNR penalties among all the subcarriers of the super-channel may be reduced.

Variation of subcarrier power levels may be achieved in one embodiment using a variable optical attenuator (VOA) for each subcarrier, for example, immediately prior to combination (i.e., multiplexing) into the super-channel (see also FIG. 1). Another implementation may use wavelength selective switches (WSS) having optical power equalization functionality to selectively attenuate power levels in subcarriers along the transmission path. A required power adjustment per subcarrier may be pre-calculated using various parameters and information, such as channel spacing, a number of channels and certain fiber parameters (i.e., dispersion parameters, non-linear coefficients, and effective fiber lengths). Such parameters and other information about the optical network may be stored in a database and extracted by a Path Computation Engine (PCE—see also FIG. 5). Then, instructions may be transmitted to respective optical devices to implement the desired power level per subcarrier. The optical devices receiving instructions to set the subcarrier power level may include VOAs and WSSs in the optical network.

Although the example spectra of a super-channel depicted in FIGS. 2 and 3 are shown with 5 subcarrier bands, it is noted that the methods described herein may be practiced on super-channels having different numbers of subcarrier bands. For example, when the super-channel has an even number of subcarriers, such as 4, 6, 8, 10, etc., the intermediate bands may comprise all the subcarrier bands except the two edge subcarrier bands, since no center subcarrier band is present. The center band (when present) may be omitted from application of power level adjustments in various super-channel configurations. Also, in instances where a number of adjusted subcarrier bands, optionally including intermediate subcarrier bands and edge subcarrier bands, is four or more, a magnitude of the power level adjustment may depend on a position of an adjusted subcarrier band within the super-channel. As noted above, the first adjusted power level of edge bands 303-1, 303-5 may be different than the second adjusted power level of intermediate bands 303-2, 303-4.

Figure 4:
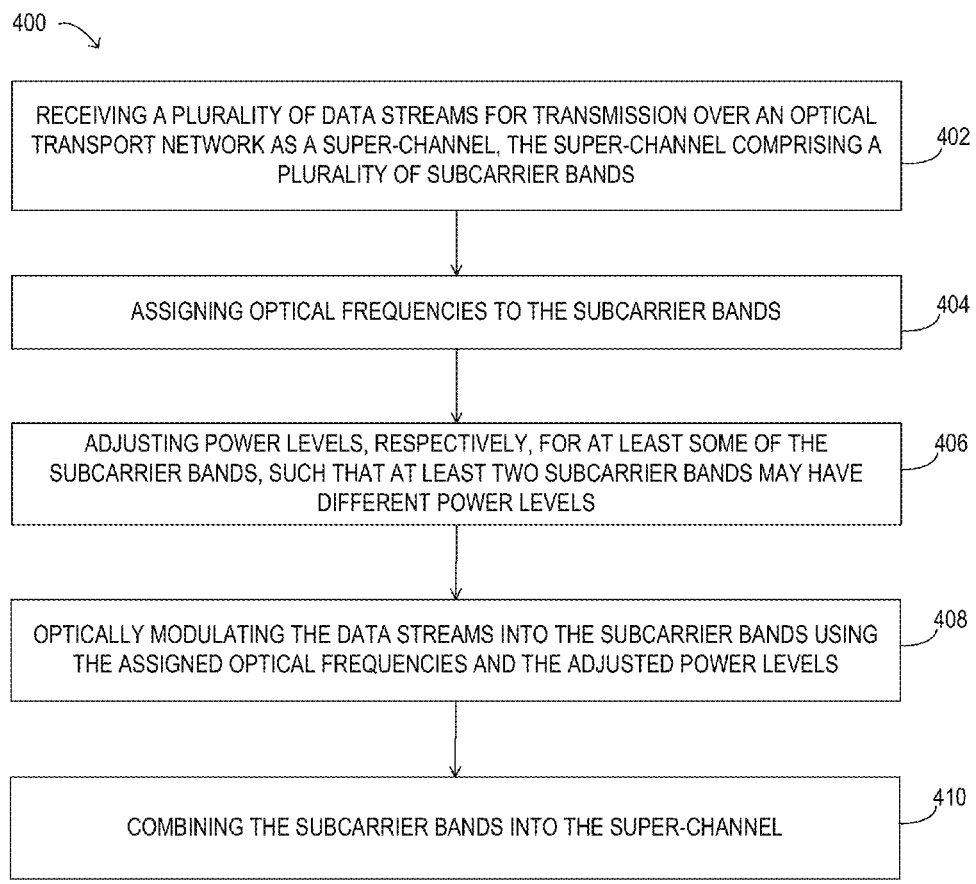
FIG. 4 is a flow chart of selected elements of an embodiment of a method for implementing variable subcarrier power levels.

Turning now to FIG. 4, method 400 for performing variable subcarrier power level adjustment is shown in flow chart form. As shown method 400 may be performed using optical transport network 101 (see FIG. 1). It is noted that operations described with respect to method 400 may be omitted or rearranged in different embodiments.

Method 400 may begin by receiving (operation 402) a plurality of data streams for transmission over an optical transport network as a super-channel, the super-channel comprising a plurality of subcarrier bands. In certain embodiments, the plurality of data streams may directly correspond to the plurality of subcarrier bands. In other embodiments, only certain ones of the plurality of data streams may directly correspond to the plurality of subcarrier bands, while other ones of the plurality of data streams may be processed in some manner (i.e., interleaved, averaged, decimated, de-interleaved, etc.) to form a subcarrier band. The plurality of subcarrier bands may represent all the bands in a super-channel. Optical frequencies may be assigned (operation 404) to the subcarrier bands. Power levels may be respectively adjusted (operation 406) for at least some of the subcarrier bands, such that at least two subcarrier bands may have different power levels. In various embodiments, the power level adjustment in operation 406 may be applied symmetrically with respect to a center frequency of the subcarrier bands, the center frequency given by the average of the frequencies of two edge subcarrier bands. The power level adjustment may be a reduction in power level and may depend upon a position of a subcarrier band within the super-channel. In certain embodiments, applying the power level adjustment in operation 406 is performed in response to receiving an error rate measurement on the plurality of data streams after transmission of the super-channel. The data streams may be optically modulated (operation 408) into the subcarrier bands using the assigned optical frequencies and the adjusted power levels. The subcarrier bands may be combined (operation 410) into the super-channel.

Figure 5:
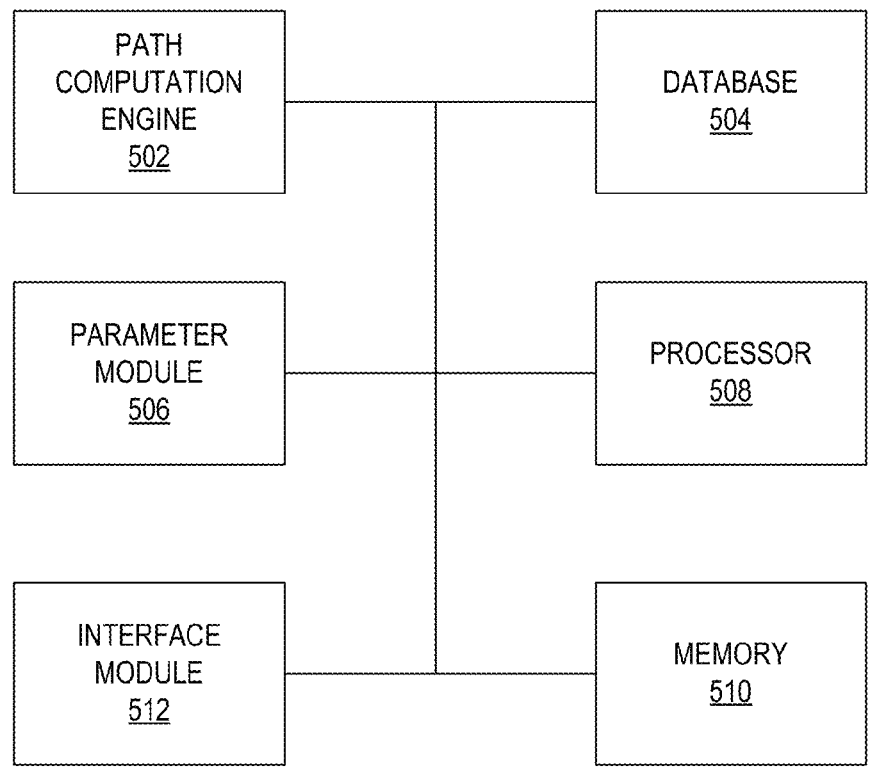
FIG. 5 is a block diagram of selected elements of an embodiment of an optical control plane system for obtaining optical path information.

Turning now to FIG. 5 a block diagram of selected elements of an embodiment of optical control plane system 500 for obtaining optical path information of an optical signal transmission path, in accordance with certain embodiments of the present disclosure. System 500 may include path computation engine 502, database 504, parameter module 506, processor 508, memory 510, and interface module 512.

In some embodiments, interface module 512 may be configured to receive data concerning an optical signal transmission path in an optical network, such as optical transport network 101 (see FIG. 1). That is, interface module 512 may receive data about the optical signal transmission path, such as, fiber type; fiber length; number and/or type of components, such as a dispersion compensation module, ADM, amplifier, multiplexer, or demultiplexer, in the optical signal transmission path; data rate; modulation format of the data; input power of the optical signal; number of signal carrying wavelengths, which may be referred to herein as channels; channel spacing; traffic demand; and/or network topology, among others. For example, interface module 512 may enable system 500 to communicate with various network devices (not shown) along the optical signal transmission path to receive the data concerning the optical signal transmission path. Furthermore, in accordance with the methods disclosed herein, interface module 512 may enable system 500 to send instructions to certain nodes in the optical signal transmission path to adjust a power level of selected subcarrier bands when a super-channel is being transmitted, as described previously. Specifically, in certain embodiments, interface module 512 may be enabled to send instructions to VOAs and/or ROADMs which include a WSS to attenuate fiber input power for specific subcarriers, as described above.

As an illustrative example, in some embodiments, interface module 512 may be configured to interface with a person (i.e., a user) and receive data about the optical signal transmission path. For example, interface module 512 may also include and/or may be coupled to one or more input devices and/or output devices to facilitate receiving data about the optical signal transmission path from the user and/or outputting results to the user. The one or more input and/or output devices (not shown) may include, but are not limited to, a keyboard, a mouse, a touchpad, a microphone, a display, a touchscreen display, an audio speaker, or the like. Alternately or additionally, interface module 512 may be configured to receive data about the optical signal transmission path from a device such as a computing device (not shown).

In some embodiments, parameter module 506 may be configured to provide parameters concerning the optical signal transmission path based on the data received about the optical signal transmission path by interface module 512. As an illustrative example, parameter module 506 may provide parameters regarding the fiber type, such as a dispersion map for the fiber type and other optical properties of the fiber type. As another example, parameter module 506 may provide parameters concerning the components in the optical signal transmission path. For example, the parameters of the components provided by parameter module 506 may describe certain optical properties of the components. In some embodiments, parameter module 506 may provide some of or all of the optical properties of the components in the optical signal transmission path that may be used by path computation engine 502.

Path computation engine 502 may be configured to use the parameters from the parameter module 506 and the data from interface module 512 to determine transmission characteristics of the optical signal transmission path. The transmission characteristics of the optical signal transmission path may provide insight on how transmission degradation factors, such as chromatic dispersion (CD), non-linear (NL) effects, polarization effects, such as polarization mode dispersion (PMD) and polarization dependent loss (PDL), amplified spontaneous emission (ASE) and/or others may affect optical signals within the optical signal transmission path. To determine the transmission characteristics of the optical signal transmission path, path computation engine 502 may consider the interplay between the transmission degradation factors. In various embodiments, path computation engine 502 may generate values for specific transmission degradation factors.

In some embodiments, path computation engine 502 may provide the accumulated amount of each transmission degradation factor for the optical signal transmission path. Alternately or additionally, path computation engine 502 may provide the OSNR penalty due to each transmission degradation factor. Alternately or additionally, path computation engine 502 may provide the OSNR penalty due to a combination of one or more transmission degradation factors. Alternately or additionally, path computation engine 502 may provide the total OSNR of the optical signal transmission path. The total OSNR may be the optimal OSNR that may be achieved along the optical signal transmission path without any degradation. Alternatively or additionally, path computation engine 502 may determine OSNR degradation along the optical signal transmission path, for example, when OSNR degradation is due to non-linear intra subcarrier interactions. In some embodiments, path computation engine 502 may provide additional information regarding the optical signal transmission path.

Database 504 may be configured to store the data produced by path computation engine 502 about the optical signal transmission path. Processor 508 may be configured to execute computer instructions that cause the system 500 to perform the functions and operations described herein. The computer instructions may be loaded into the memory 510 for execution by processor 508 and/or data generated, received, or operated on during performance of the functions and operations described herein may be at least temporarily stored in memory 510.

While the subject of this specification has been described in connection with one or more exemplary embodiments, it is not intended to limit any claims to the particular forms set forth. On the contrary, any claims directed to the present disclosure are intended to cover such alternatives, modifications and equivalents as may be included within their spirit and scope.

What is claimed is:

1. A method of reducing crosstalk among subcarriers of a super-channel, the method comprising: receiving a plurality of data streams for transmission over an optical transport network as the super-channel, the super-channel comprising a plurality of subcarrier bands, wherein each of the plurality of subcarrier bands is comprised of a plurality of subcarriers; assigning optical frequencies to the subcarrier bands; adjusting power levels, respectively, for at least some of the subcarrier bands, wherein at least two subcarrier bands have different power levels; optically modulating the data streams into the subcarrier bands using the assigned optical frequencies and the adjusted power levels; and combining the subcarrier bands into the super-channel.

2. The method of claim 1, wherein adjusting the power levels comprises sending an instruction to a variable optical attenuator associated with an optical transmitter.

3. The method of claim 1, wherein adjusting the power levels comprises sending an instruction to a wavelength selective switch.

4. The method of claim 1, further comprising:
when the plurality of subcarrier bands includes an odd number of subcarrier bands greater than 1, excluding a center subcarrier band from adjusting the power levels.

5. The method of claim 4, wherein a magnitude of an adjusted power level depends upon a position of a subcarrier band in the plurality of subcarrier bands.

6. The method of claim 1, wherein the adjusted power levels are symmetric with respect to an average optical frequency of the assigned optical frequencies.

7. The method of claim 1, wherein adjusting the power levels is performed in response to receiving an error rate measurement on data streams transmitted over the optical transport network using the super-channel.

8. An optical transport network for reducing crosstalk among subcarriers of a super-channel, comprising:
a control plane system including a processor configured to access non-transitory computer readable memory media, wherein the memory media store processor-executable instructions, the instructions, when executed by the processor, cause the processor to:
identify a plurality of data streams for transmission over an optical transport network as the super-channel, the super-channel comprising a plurality of subcarrier bands, wherein each of the plurality of subcarrier bands is comprised of a plurality of subcarriers;
assign optical frequencies to the subcarrier bands;
determine adjusted power levels, respectively, for at least some of the subcarrier bands, wherein at least two subcarrier bands have different power levels; and
send an instruction to at least one element in the optical transport network to:
optically modulate the data streams into the subcarrier bands using the assigned optical frequencies and the adjusted power levels; and
combine the subcarrier bands into the super-channel.

9. The optical transport network of claim 8, wherein the at least one element in the optical transport network comprises a variable optical attenuator associated with an optical transmitter.

10. The optical transport network of claim 8, wherein the at least one element in the optical transport network comprises a wavelength selective switch.

11. The optical transport network of claim 8, further comprising instructions to:
when the plurality of subcarrier bands includes an odd number of subcarrier bands greater than 1, exclude a center subcarrier band from the instructions to determine adjusted power levels.

12. The optical transport network of claim 11, wherein a magnitude of an adjusted power level depends upon a position of a subcarrier band in the plurality of subcarrier bands.

13. The optical transport network of claim 8, wherein the adjusted power levels are symmetric with respect to an average optical frequency of the assigned optical frequencies.

14. The optical transport network of claim 8, wherein the instructions to determine adjusted power levels are executed in response to receiving an error rate measurement on data streams transmitted over the optical transport network using the super-channel.

15. A control plane system for reducing crosstalk among subcarriers of a super-channel in an optical transport network, the control plane system for:
identifying a plurality of data streams for transmission over an optical transport network as the super-channel, the super-channel comprising a plurality of subcarrier bands, wherein each of the plurality of subcarrier bands is comprised of a plurality of subcarriers;
assigning optical frequencies to the subcarrier bands;
determining adjusted power levels, respectively, for at least some of the subcarrier bands, wherein at least two subcarrier bands have different power levels; and
sending an instruction to at least one element in the optical transport network for:
optically modulating the data streams into the subcarrier bands using the assigned optical frequencies and the adjusted power levels; and
combining the subcarrier bands into the super-channel.

16. The control plane system of claim 15, wherein the at least one element in the optical transport network comprises a variable optical attenuator associated with an optical transmitter.

17. The control plane system of claim 15, wherein the at least one element in the optical transport network comprises a wavelength selective switch.

18. The control plane system of claim 15, further for:
when the plurality of subcarrier bands includes an odd number of subcarrier bands greater than 1, excluding a center subcarrier band from determining adjusted power levels.

19. The control plane system of claim 18, wherein a magnitude of an adjusted power level depends upon a position of a subcarrier band in the plurality of subcarrier bands.

20. The control plane system of claim 15, wherein the adjusted power levels are symmetric with respect to an average optical frequency of the assigned optical frequencies.

21. The control plane system of claim 15, wherein determining the adjusted power values is performed in response to receiving an error rate measurement on data streams transmitted over the optical transport network using the superchannel.

* * * * *